(No Model.)

S. E. ROBERTS.
Corn Planter.

No. 236,361. Patented Jan. 4, 1881.

Witnesses.
F. W. Smith Jr.
John F. C. Preinkert

Inventor:
Stephen E. Roberts.
By Wm C. Witcher Attorney.

UNITED STATES PATENT OFFICE.

STEPHEN E. ROBERTS, OF PLYMOUTH, ILLINOIS.

CORN-PLANTER.

SPECIFICATION forming part of Letters Patent No. 236,361, dated January 4, 1881.

Application filed July 23, 1880. (No model.)

*To all whom it may concern:*

Be it known that I, STEPHEN E. ROBERTS, a citizen of the United States, residing at Plymouth, county of Hancock, and State of Illinois, have invented new and useful Improvements in Corn-Planters, of which the following is a specification.

My invention relates to that class of corn-planters constructed with two frames pivoted horizontally, the hopper and tongue being arranged on the front frame, and the rear frame supported by the wheels.

The object of my invention is to provide a means whereby the depth of planting may be varied by causing a deep or shallow furrow to be made by the shovels; and with this end in view, my invention consists of a cross-bar pivoted at one end in any suitable manner to the front frame, and provided at its other end with a chain or equivalent device, whereby said bar may be fastened to a hook in the rear frame at different angles, thereby increasing or diminishing the depth of the furrow, as will be hereinafter fully explained.

In order that those skilled may understand the construction and operation of my improved corn-planter, I will describe the same, referring by letters to the accompanying drawings, in which—

Figure 1:
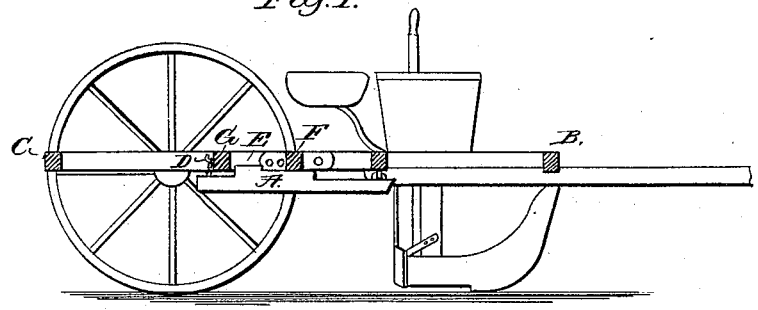
Figure 2:
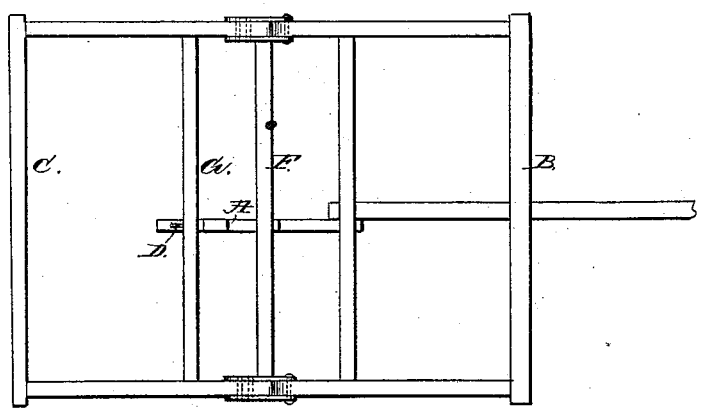
Figure 3:
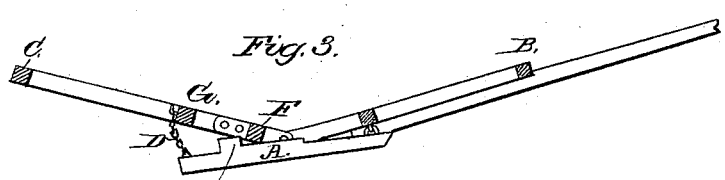
Figure 4:
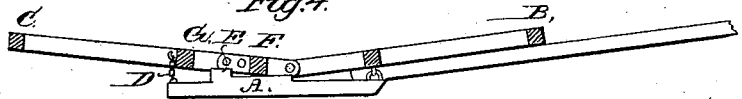

Figure 1 is a longitudinal section of an ordinary corn-planter, showing my cross-bar attached in a horizontal position. Fig. 2 is a top view of the two frames, showing my improved cross-bar underneath the same. Figs. 3 and 4 are longitudinal sections, showing the position of the frames when the cross-bar is allowed to drop at different angles.

Similar letters indicate like parts in the several figures.

A is my improved cross-bar, pivoted at one end to the front frame, B, and fastened by a chain to a hook in the rear frame, C. The two frames being supported by the wheels and shovels or plows, there is, of course, a tendency toward depression at their pivotal point, thereby causing the plow to make too deep a furrow and rendering the depth of planting very irregular, according to the nature of the ground. I am enabled to overcome this disadvantage by the use of my improved cross-bar, as follows: If, during the stage of planting, the furrow made by the plow or shovel is too deep, the driver has merely to take hold of the chain D, which may be provided with any suitable handle, and pull the cross-bar A nearer to the planter-frames, thereby decreasing the angle of elevation of the frames and causing them to assume a rigid position, tending horizontally, according as the cross-bar approaches a horizontal plane, as is clearly shown by Fig. 4. If the furrow is too shallow he simply lowers the bar, which produces an opposite effect, as seen at Fig. 3, the heel of the plow being driven deeper into the ground in proportion as the bar A is lowered.

I preferably arrange a step or series of steps, E, on my improved cross-bar to insure its abutment against the cross-piece F of the rear frame, C, before it can reach the cross-piece G, thus rendering the cross-bar parallel with the frames when the chain thereon has been drawn up to its limit, as seen at Fig. 1.

I do not wish to confine myself to the specific style of cross-bar, as any bar, round or otherwise, provided with steps or not, would perform a like service.

What I claim as new, and desire to secure by Letters Patent, is—

In a corn-planter composed of two frames pivoted horizontally, the rear frame having cross-bars F G, the independent longitudinal bar A, pivoted at its front end to the central cross-bar of the front frame and provided at its rear end with a chain adapted to hook over a hook on the cross-bar G, substantially as and for the purpose set forth.

In testimony whereof I have hereunto set my hand in the presence of two subscribing witnesses.

STEPHEN E. ROBERTS.

Witnesses:
LEWIS GRAHAM,
S. C. GILBERT.